United States Patent [19]

Prellwitz

[11] Patent Number: 4,511,165
[45] Date of Patent: Apr. 16, 1985

[54] BALER KNOTTING DEVICE WITH COMPLEMENTARY KNOTTER AND STRIPPER

[75] Inventor: Hubert Prellwitz, Polenz, German Democratic Rep.

[73] Assignee: VEB Kombinat Fortschritt Landmaschinen, Neustadt, German Democratic Rep.

[21] Appl. No.: 509,243

[22] Filed: Jul. 27, 1983

[30] Foreign Application Priority Data

Oct. 11, 1982 [DD] German Democratic Rep. ... 243889

[51] Int. Cl.³ .............................................. B65H 69/04
[52] U.S. Cl. ............................................ 289/8; 289/11
[58] Field of Search ......................................... 289/8, 11

[56] References Cited

U.S. PATENT DOCUMENTS

| 306,232 | 10/1884 | Eavenson | 289/11 |
| 3,410,589 | 11/1968 | Nolt | 289/11 X |

FOREIGN PATENT DOCUMENTS

| 1165922 | 3/1964 | Fed. Rep. of Germany | 289/8 |
| 694613 | 12/1930 | France | 289/11 |
| 966268 | 10/1950 | France | 289/11 |
| 111770 | 3/1975 | German Democratic Rep. | 289/8 |

Primary Examiner—Louis K. Rimrodt
Attorney, Agent, or Firm—Karl F. Ross; Herbert Dubno

[57] ABSTRACT

A knotting device for a baling machine has a pivotal knotting element having a lower jaw and an upper jaw that are pivoted together and have separable tips. The lower jaw has a lower side formed with a pair of parallel and downwardly projecting ridges defining a downwardly open groove extending to the respective tip. Thus when a loop of a tie is tight around the jaws it spans this groove. It also has a pair of lateral sides each formed with a longitudinal ridge of cross section decreasing toward the respective tip. A stripping element is displaceable along the sides of the lower jaw by an appropriate actuator to push a loop from the jaws. Once the loop is formed and the two strands are gripped between the upper and lower jaws it will be stripped accurately from the knotter no matter how small it is, since it will only engage at the ridges. The stripping element has an upper edge complementary with at least the lower side of the knotting element and having a bump engaging in the ridge thereof so the upper edge of the stripping element is formed with a notch complementarily receiving the knotting element.

3 Claims, 2 Drawing Figures

4,511,165

BALER KNOTTING DEVICE WITH COMPLEMENTARY KNOTTER AND STRIPPER

FIELD OF THE INVENTION

The present invention relates to a baling machine. More particularly this invention concerns a knotting device for a baling machine.

BACKGROUND OF THE INVENTION

A standard bale-tying unit of the Deering type that forms a knot in the tie, which can be either a metal wire, a filament twine, or even a synthetic-resin filament, has tie-holding disks rotatable about a horizontal axis adjacent the trailing bale end and a knotter rotatable about a vertical axis upstream of this trailing bale end. After each tying operation the free end of the tie is left in this holder and this tie extends downstream over the leading end of the bale and then back along underneath it. At the trailing bale end the tie passes through a needle which can engage up behind the bale when the plunger of the baling machine has compressed it downstream. When the needle does this it engages a portion of the tie in the holder, which rotates as the needle withdraws so that the tie is very tightly held around the bale.

The knotter is provided immediately adjacent this holder and has, relative to its vertical axis lying generally at the trailing bale end, upper and lower radially extending jaws, the lower of which is fixed and the upper of which is shaped like a hook and pivotal toward and away from the lower jaw. The knotter first rotates with the two jaws together to loop the two strands of the tie around itself, but on returning opens its two jaws so the strands are caught between them. This leaves a complete loop of both strands of the tie wound around the two jaws with the two ends then passing between these jaws. The ties are then cut between the knotter and the holder and the loop is pushed off the knotter, releasing the double overhand knot thus formed. This effectively and neatly knots the ends of the portion of tie snugged around the bale. The entire operation is wholly automatic, very fast, and quite smooth. Simple cams acting on the needle, holder, knotter, and knife displace these elements wholly pivotally for perfectly synchronous operation.

The jaws are usually tapered toward their tips, that is away from the knotter pivot axis. The stripper usually is formed with a notch that conforms to the shape of the upright lateral sides and the lower side of the lower jaw at its widest dimension. Thus as the stripper pivots or slides along the knotter to strip the loops of the tie from it, the space between the edges of the stripper at the notch and the corresponding sides of the lower jaw increases.

When a relatively thin tie is used, as for example a tough synthetic-resin cord, it is possible for this tie, which is under some tension as the plunger of the baler releases the hay or other crop contained by it, to slip between the stripper and knotter and remain caught on the knotter. The bale thus hangs up on the knotter. If the machine is not set up to shut down in this case, it can be damaged seriously as the conveyor attempts to pull out the old bale so a new bale can be formed.

West German patent document No. 1,164,922 and East German utility model 9341 of G. Raussendorf describe an arrangement wherein friction between the loops on the jaws is minimized by forming the lateral sides of the lower jaw with oppositely outwardly open grooves. This minimizes the contact area between the tie and the knotter to make it easier to push it off the knotter. Nonetheless for safety's sake it is standard practice even with this system and a small-section tie to use low tension to prevent the equipment from jamming, thereby creating undesirably loose bales.

OBJECTS OF THE INVENTION

It is therefore an object of the present invention to provide an improved baling-machine knotting device.

Another object is the provision of such a baling-machine knotting device which overcomes the above-given disadvantages, that is wherein even a relatively thin tie is accurately stripped from the knotter.

SUMMARY OF THE INVENTION

A knotting device for a baling machine according to the invention has a pivotal knotting element having a lower jaw and an upper jaw that are pivoted together and have separable tips. The lower jaw has a lower side formed with a pair of parallel and downwardly projecting ridges defining a downwardly open groove extending to the respective tip. Thus when a loop of a tie is tight around the jaws it spans this groove. It also has a pair of lateral sides each formed with a longitudinal ridge of cross section decreasing toward the respective tip. A stripping element is displaceable along the sides of the lower jaw by an appropriate actuator to push a loop from the jaws.

Thus with the system of this invention once the loop is formed and the two strands are gripped between the upper and lower jaws it will be stripped accurately from the knotter no matter how small it is, since it will only engage at the ridges. In addition according to this invention the stripping element has an upper edge complementary with at least the lower side of the knotting element and having a bump engaging in the ridge thereof. More particularly the upper edge of the stripping element is formed with a notch complementarily receiving the knotting element. With this system even a very small-section tie will be accurately pushed off the knotter.

According to another feature of this invention the actuator means displaces the stripping element substantially parallel to and at a fixed spacing from the lower side. Normally the stripping element is pivotal about an axis and the lower side lies generally on a curve substantially centered on the axis.

DESCRIPTION OF THE DRAWING

The above and other features and advantages will become more readily apparent from the following, reference being made to the accompanying drawing in which.

SPECIFIC DESCRIPTION

Figure 1:
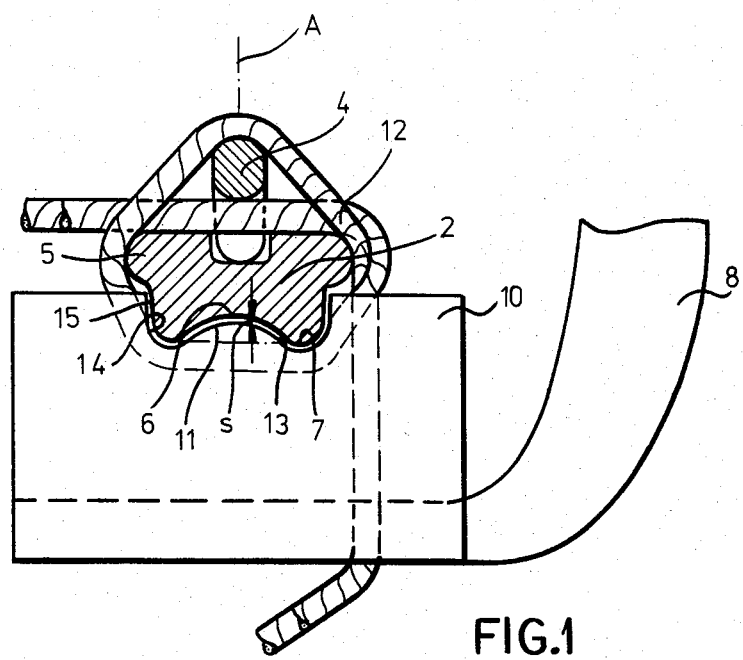
FIG. 1 is a cross section through the knotting device according to the invention.
Figure 2:
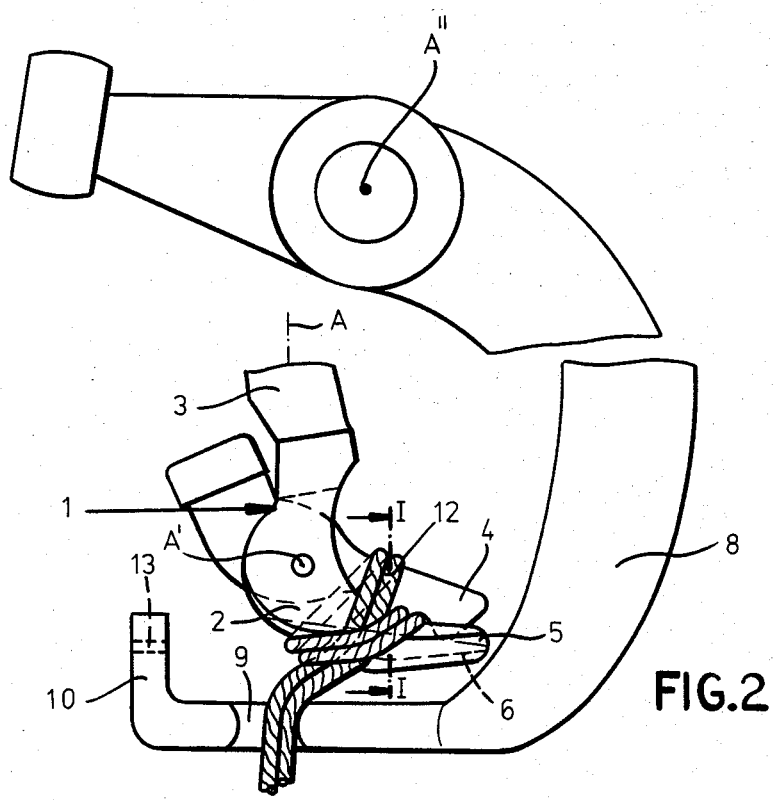
FIG. 2 is a side view of the knotting device of FIG. 1.

As seen in FIGS. 1 and 2 a knotter 1 has a lower jaw 2 fixed on an upright shaft 3 pivotal about a vertical axis A and an upper jaw 4 pivotal on the lower jaw 3 about a horizontal axis A'. A stripper 8 having a stripper flange 10 can pivot about a horizontal axis A" above the axis A', although it is of course possible to use the system on its side or upside down so that the up and down terminology used above and below is to be understood purely relatively.

The lower jaw 2 is formed on its two sides with ridges 5 that taper, that is decrease in cross-sectional size, toward the tip of the lower jaw, that is its end remote from the axis A'. In addition its lower surface is formed with two uniform-section ridges 7 defining a downwardly open notch 6. These ridges 7 and groove 6 extend substantially along a curve centered on the axis A" in the illustrated stripping position of FIG. 2.

The stripper 8 is formed with an eye 9 through which the two strands of the tie 12 extend. In addition it is formed with an upwardly open stripper notch 13 that is formed at its base with a bump 11 that is complementary to the groove 6. This notch 13 has sides 14 that engage in the grooves 15 formed between the ridges 5 and the ridges 7.

Thus with the system of this invention the spacing s between the notch 13 and the lower surface of the lower jaw 2 is substantially constant, and always greater than the minimum diameter of a tie 12. There is therefore no possibility of the tie 12 getting stuck between the two elements.

I claim:

1. A knotting device for a baling machine, the knotting device comprising:

a pivotal knotting element having a lower jaw and an upper jaw, the jaws being pivoted together and having separable tips, the lower jaw having
  a lower side formed with a pair of parallel and downwardly projecting ridges defining a downwardly open groove extending to the respective tip, whereby when a loop of a tie is tight around the jaws it spans this groove, and
  a pair of lateral sides each formed with a longitudinal ridge of cross section decreasing toward the respective tip;
a stripping element displaceable along the lower jaw and having an upper edge complementary with at least the lower side of the knotting element and having a bump engaging in the ridge thereof; and
means for displacing the stripping element substantially parallel to and at a fixed spacing from the lower side across the lower jaw and push a loop from the jaws.

2. The baling-machine knotting device defined in claim 1 wherein the upper edge of the stripping element is formed with a notch complementarily receiving the knotting element.

3. The baling-machine knotting device defined in claim 1 wherein the stripping element is pivotal about an axis and the lower side lies generally on a curve substantially centered on the axis.

* * * * *